(12) United States Patent
Eichelberger

(10) Patent No.: US 8,540,409 B2
(45) Date of Patent: Sep. 24, 2013

(54) LIGHT GUIDE AND SEMICONDUCTOR LUMINAIRE

(75) Inventor: Christopher Eichelberger, Livonia, MI (US)

(73) Assignee: OSRAM Opto Semiconductors GmbH, Regensburg (DE)

( * ) Notice: Subject to any disclaimer, the term of this patent is extended or adjusted under 35 U.S.C. 154(b) by 532 days.

(21) Appl. No.: 12/789,398

(22) Filed: May 27, 2010

(65) Prior Publication Data

US 2011/0292660 A1  Dec. 1, 2011

(51) Int. Cl.
*F21V 17/00* (2006.01)
*F21V 8/00* (2006.01)
*F21V 9/16* (2006.01)
*G02B 6/43* (2006.01)

(52) U.S. Cl.
USPC ...... 362/581; 362/231; 362/311.06; 362/555; 385/92; 385/121

(58) Field of Classification Search
USPC .............. 362/311.06, 555, 581, 800; 385/88, 385/89, 92, 121, 146
See application file for complete search history.

(56) References Cited

U.S. PATENT DOCUMENTS

| | | | | |
|---|---|---|---|---|
| 3,456,211 A | * | 7/1969 | Koester | 372/6 |
| 5,271,079 A | * | 12/1993 | Levinson | 385/46 |
| 5,764,845 A | * | 6/1998 | Nagatani et al. | 385/146 |
| 5,982,969 A | * | 11/1999 | Sugiyama et al. | 385/123 |
| 6,637,924 B2 | * | 10/2003 | Pelka et al. | 362/555 |
| 6,768,850 B2 | * | 7/2004 | Dugan et al. | 385/124 |
| 6,832,849 B2 | * | 12/2004 | Yoneda et al. | 362/551 |
| 6,975,805 B2 | * | 12/2005 | Hanson et al. | 385/146 |
| 7,298,936 B1 | * | 11/2007 | Wach et al. | 385/14 |
| 7,488,101 B2 | | 2/2009 | Brukilacchio | |
| 7,942,562 B2 | * | 5/2011 | Hatzenbuehler et al. | 362/555 |
| 2007/0279941 A1 | | 12/2007 | Koshio | |
| 2008/0239748 A1 | | 10/2008 | Hatzenbuehler et al. | |
| 2009/0091913 A1 | | 4/2009 | Li et al. | |

FOREIGN PATENT DOCUMENTS

| | | |
|---|---|---|
| DE | 10 2007 014 871 | 10/2008 |
| JP | 63014108 A * | 1/1988 |
| WO | WO 2010/044030 | 4/2010 |
| WO | WO 01/46734 | 6/2011 |

* cited by examiner

*Primary Examiner* — Alan Cariaso
(74) *Attorney, Agent, or Firm* — Cozen O'Connor

(57) ABSTRACT

In at least one embodiment, the light guide (10) comprises a single-pieced light guide body (1). The light guide body (1) includes a transparent material and a light entrance segment (2) having a first cross-section (11) with a polygonal shape. Furthermore, the light guide body (1) includes a light output segment (4) having a second cross-section (22) with a rotund, round, circular, oval or elliptic shape. A transition segment (3) is arranged adjacent to and between the light entrance segment (2) and the light output segment (4). Along the transition segment (3), the first cross-section (11) in particular continuously changes to the second cross-section (22).

12 Claims, 4 Drawing Sheets

LIGHT GUIDE AND SEMICONDUCTOR LUMINAIRE

FIELD OF THE INVENTION

The invention relates to a light guide and a semiconductor luminaire comprising a light guide.

BACKGROUND OF THE INVENTION

In the document U.S. Pat. No. 7,488,101 B2, a high intensity LED array illuminator is disclosed.

SUMMARY OF THE INVENTION

It is an object of the present invention to provide a light guide that is capable of mixing different colors of a radiation. Another object of the present invention is to provide a semiconductor luminaire comprising such a light guide.

According to at least one embodiment, the light guide comprises a light guide body. The light guide body is preferably single-pieced. Also preferably, the light guide body comprises or consists of a transparent material. For example, the light guide body is made of a glass or a plastic. By way of example, the light guide body is made of polymethyl methacrylate, in short PMMA, or it is made of polycarbonate, in short PC.

According to at least one embodiment, the light guide body is provided with a light entrance segment having a first cross-section with a polygonal shape. The light entrance segment is in particular a part of the light guide body on a side of the light guide body on which radiation is coupled into the light guide body. In particular, the light entrance segment comprises a light entrance face of the light guide.

According to at least one embodiment, the light guide body comprises a light output segment. The light output segment has a second cross-section. The second cross-section is shaped without corners. In other words, the second cross-section is not polygonal in shape. For example, the second cross-section has a rotund, round, circular, elliptic and/or oval shape. In particular, the light output segment comprises a light output face of the light guide.

According to at least one embodiment, the light guide body comprises a transition segment. The transition segment is arranged between the light entrance segment and the light output segment. In particular, the transition segment is adjacent to the light entrance segment and the light output segment. The transition segment can be in direct contact with the light entrance segment and with the light output segment.

According to at least one embodiment of the light guide, along the transition segment, the first cross-section changes to the second cross-section. Near the light entrance segment, the transition segment can have a basically polygonal cross-section and near the light output segment, the transition segment can have a basically rotund or round cross-section. In particular, along the transition segment, the first cross-section can continuously change to the second cross-section.

In at least one embodiment, the light guide comprises a single-pieced light guide body. The light guide body includes a transparent material and a light entrance segment having a first cross-section with a polygonal shape. Furthermore, the light guide body includes a light output segment having a second cross-section with a rotund, round, circular, oval or elliptic shape. A transition segment is arranged adjacent to and between the light entrance segment and the light output segment. Along the transition segment, the first cross-section preferably smoothly or continuously changes to the second cross-section. This can mean that a surface line, in particular each surface line, along the main extend of the light guide body can be described by a continuous derivable function.

When light of different unmixed colors enters a light guide having, in particular, a circular cross-section, the different colors of the light are only merely mixed along the circular light guide. The mixing of light is greatly enhanced when the light guide has a polygonal cross-section, for example in the form of a square. However, in many applications, a circular cross-section of the light guide is preferred, for example to enhance the guidance capability along the light guide. Hence, the light guide as described above comprises a good mixing capability of multi-colored light as well as a good coupling behavior to a light guide with a circular cross-section.

According to at least one embodiment of the light guide, the cross-section along the light entrance segment and/or along the light output segment is constant or nearly constant. In other words, the cross-section along the light guide body only changes in the transition segment.

According to at least one embodiment of the light guide, the light guide body is a massive and/or compact body. In other words, the light guide body is free of holes or cavities.

According to at least one embodiment, the light guide body is comprised of a homogeneously distributed material. In other words, in a direction perpendicular to a direction of main light guidance, a refractive index of the light guide body is constant or nearly constant. This can mean that there is no step like characteristic of the refractive index along the diameter of the light guide body. This can be true for at least one or for all of the light entrance segment, the transition segment and the light output segment.

According to at least one embodiment of the light guide, the first cross-section comprises an area A1 and the second cross-section comprises an area A2. The ratio A2/A1 is not less than 0.7, in particular not less than 1.0 or not less than 1.2.

According to at least one embodiment of the light guide, the ratio A2/A1 is equal to or less than 3, in particular equal to or less than 2 or equal to or less than 1.5. In other words, the second cross-section of the light output segment can have a greater area than the first cross-section of the light entrance segment.

According to at least one embodiment, the area of the first cross-section equals the area of the second cross-section, in particular with a tolerance of at least 20% or a tolerance of at least 10%, or a tolerance of at least 5%.

According to at least one embodiment, the transition segment comprises a length T and the second cross-section comprises an average diameter D2. A ratio T/D2 is not less than 0.65, in particular not less than 0.75, or not less than 0.85.

According to at least one embodiment of the light guide, the ratio T/D2 is equal to or less than 5, in particular equal to or less than 1.75, or equal to or less than 1.5.

According to at least one embodiment of the light guide, the average diameter D2 of the second cross-section is between 3 mm and 25 mm inclusive, in particular between 4 mm and 15 mm inclusive.

According to at least one embodiment of the light guide, the average diameter D of the first and/or the second cross-section is given by the square root of four times the area A of the first/second cross-section divided by π:

$$D = \sqrt{\frac{4A}{\pi}}.$$

According to at least one embodiment of the light guide, the light guide body comprises an overall length L and the light entrance segment comprises a length E. For a ratio E/L applies that E/L is not less than 0.4, in particular not less than 0.5, or not less than 0.6.

According to at least one embodiment of the light guide, the ratio E/L is equal to or less than 0.65, in particular equal to or less than 0.75, or equal to or less than 0.8.

According to at least one embodiment of the light guide, a length of the light entrance segment is greater than a length of the transition segment and/or is greater than a length of the light output segment. Moreover, a length of the light output segment can be smaller than a length of the transition segment. In particular, the length of the light output segment is equal to or at most 0.3 L or 0.1 L.

According to at least one embodiment of the light guide, a ratio T/L is not less than 0.1, in particular not less than 0.2, or not less than 0.3.

According to at least one embodiment of the light guide, the ratio T/L of the overall length of the light guide and the length of the transition segment is equal to or less than 0.8, in particular equal to or less than 0.7, or equal to or less than 0.6.

According to at least one embodiment, the light guide further comprises a light pipe. The light pipe that in particular can have a rotund, circular or round cross-section can be arranged near the light output face of the light output segment of the light guide body. The light pipe can also be in close contact with the light output face of the light output segment, or the light pipe can be fused with the light output face of the light output segment. In this embodiment, the light guide body comprising the light entrance segment is intended for mixing different colors of a radiation, wherein the light pipe is intended for an enhanced guidance of light.

According to at least one embodiment of the light guide, the first cross-section of the light entrance segment has between three corners and twelve corners inclusive, in particular between four corners and eight corners inclusive, or between four corners and six corners inclusive. For example, the shape of the first cross-section is rectangular or square. Also, it is possible that the shape of the first cross-section is of a regular pentagon or of a regular hexagon.

According to at least one embodiment of the light guide, a maximum diameter of the light guide body is constant or nearly constant along the whole light guide body. Nearly constant can mean that the maximum diameter is constant with a tolerance of at most 20%, in particular with a tolerance of at most 10% or at most 5%. In other words, for example, a diagonal of a square shaped cross-section of the light entrance segment is equal to or nearly equal to a diameter of a circular shaped second cross-section of the light output segment.

According to at least one embodiment, a cross-section area of the light guide body monotonically or strictly monotonically increases along the direction of main light guidance. The direction of main light guidance, in particular, is the direction of main extent of the light guide body.

According to at least one embodiment, the light guide further comprises a cladding. Preferably, the cladding is in direct contact with the light guide body.

According to at least one embodiment of the light guide, the cladding comprises a translucent material with a coefficient of reflection of at least 0.75, in particular of at least 0.85, or at least 0.9. By way of example, the cladding can be formed of a white reflective plastic or of a metallic reflective film or layer.

According to at least one embodiment, the light along the light guide body is guided by reflection on an interface between the light guide body and the cladding. The reflection can be normal reflection and/or total reflection.

According to at least one embodiment, the light guide body is surrounded by air or by a medium of lower refractive index than the material of the light guide body. In this case, the light in the light guide body is predominantly or exclusively guided by total internal reflection.

According to at least one embodiment, the cladding completely covers the light guide body in a direction perpendicular to a direction of main light guidance. It is possible that the cladding protrudes over the light guide body on the light entrance face and/or on the light output face, so that a length of the cladding exceeds the length of the light guide body. Alternatively, the cladding can be flush with the light entrance face and/or the light output face. In this case, the cladding can have the same or a similar length as the light guide body.

According to at least one embodiment, the cladding has a constant or nearly constant diameter along the direction of main light guidance. Preferably, along the direction of main light guidance, the cladding has a cross-section that is polygonal or rotund in shape. For example, the cross-section of the cladding is square or circular.

According to at least one embodiment of the light guide, the light guide body is a rigid body. In other words, in the intended use of the light guide, the light guide body does not bend or drill.

According to at least one embodiment of the light guide, the light guide body has a longitudinal axis which is a straight line. In other words, the light guide body is not curved along a direction of main extension.

Moreover, a semiconductor luminaire is provided. The semiconductor luminaire comprises one or more light guides as described above. Features of the semiconductor luminaire are thus also disclosed for the light guide and vice-versa.

According to at least one embodiment, the semiconductor luminaire comprises a carrier and at least one light source arranged on the carrier. The carrier can be a circuit board or a printed circuit board. For example, the carrier is based on a plastic, a metal core board or a ceramic.

According to at least one embodiment, the light source includes one or, preferably, more than one optoelectronic semiconductor chip for emitting radiation. In particular, the radiation emitted by the light source is exclusively produced by optoelectronic semiconductor chips, for example, by light emitting diodes or by laser diodes.

According to at least one embodiment, the semiconductor luminaire further comprises a housing. The housing provides a firm mechanical connection between the carrier and the light guide. In other words, the light guide is fixed with the carrier by means of the housing. The housing can be formed of a translucent plastic.

According to at least one embodiment, in operation the light source emits multi-colored visible radiation. For example, the light source emits blue and yellow radiation, or the light source emits at least red, green, and blue light.

According to at least one embodiment, the light guide is capable of mixing the different colors of the multi-colored visible radiation emitted by the light source. That is, on the light entrance face of the light guide body, the radiation emitted by the light source might be inhomogeneously distributed across the first cross-section concerning the color of the radiation. After passing the light guide, the multi-colored visible radiation is mixed. In particular, the emitted radiation is homogeneous white light.

In at least one embodiment, the semiconductor luminaire includes at least one light guide and a carrier as well as a light source arranged on the carrier. The light source comprises at least one optoelectronic semiconductor chip for emitting radiation. Moreover, the semiconductor luminaire includes a housing providing a firm mechanical connection between the carrier and the light guide. In operation, the light source emits multi-colored visible radiation and the light guide is capable of mixing the different colors of the multi-colored visible radiation emitted by the light source.

According to at least one embodiment of the semiconductor luminaire, the light guide is irreversibly fixed with the carrier by the housing. In other words, the light guide cannot be removed from the semiconductor luminaire without destruction of the light guide an/or the housing.

According to at least one embodiment, the light entrance face of the light guide body of the light guide is form-fit with the light source and/or the carrier, at least in part. This can be realized, for example, by casting the light guide body onto the carrier and/or onto the light source.

According to at least one embodiment, the housing of the semiconductor luminaire further comprises a connector for mechanically and/or optically connecting the light pipe with the semiconductor lamp. The connector can be a reversible or an irreversible one. The light pipe can be in direct contact or can also be arranged in a distance from the light output face of the light guide body.

According to at least one embodiment, the connector is located on the light output face of the light guide body. The connector can be a part of the housing that is formed as a plug or as a thread.

DETAILED DESCRIPTION OF THE DRAWINGS

In the exemplary embodiments and figures, similar or similarly acting constituent parts are provided with the same reference symbols. The elements illustrated in the figures and their size relationships among one another should not be regarded as true to scale. Rather, individual elements may be represented with an exaggerated size for the sake of better representability and/or for the sake of better understanding.

Figure 1A:
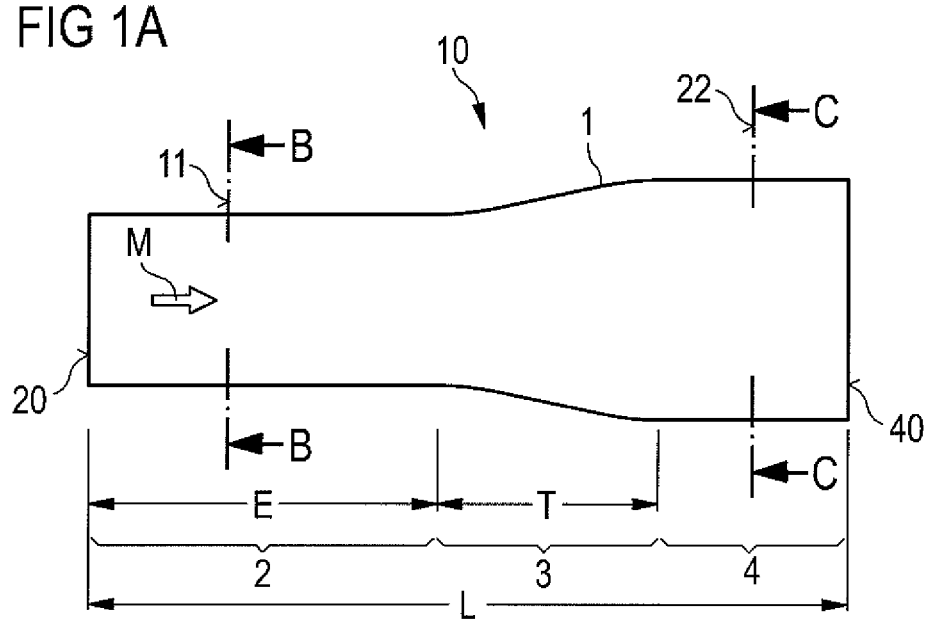
FIGS. 1 to 4 show exemplary embodiments of light guides described here.
Figure 1B:
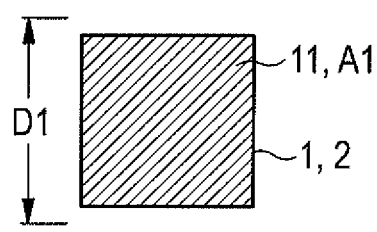
Figure 1C:
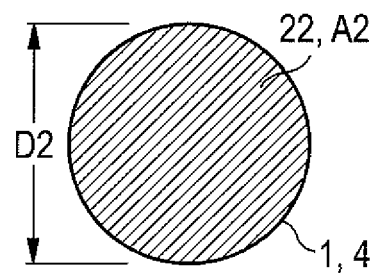

An exemplary embodiment of a light guide 10 is shown in FIG. 1. A side view of the light guide 10 is illustrated in FIG. 1A and cross-sectional views are shown in FIGS. 1B and 1C. The light guide 10 comprises a light guide body 1. In the light guide body 1, light is guided along a direction M of main light guidance. Along the direction M, the light guide body 1 has a length L, for example, between 10 mm and 100 mm, inclusive.

The light guide body 1 includes a light entrance segment 2, a light output segment 4, and a transition segment 3 which is adjacent to and between the light entrance segment 2 and the light output segment 4. A first cross-section 11 of the light entrance segment 2 is square in shape and has an area A1. An average diameter D1 of the first cross-section 11 is given by the square root from four times the area A1 divided by π. The light output segment 4 has a circular second cross-section 22 with an area A2 and a diameter D2. Both the average diameter D1 and the area A1 of the first cross-section could be smaller than the diameter D2 and the area A2 of the second cross-section 22. A light entrance face 20 of the light guide 10 can be found on the light entrance segment 2 and a light output face 40 can be found on the light output segment 4.

Along the transition segment 3, the first cross-section 11 changes to the second cross-section 22. The first cross-section 11 and the second cross-section 22 along the light entrance segment 2 and the light output segment 4 respectively, are constant. Hence, a cross-section of the light guide body 1 only changes in the transition segment 3. A length T of the transition segment 3 preferably lies between a length E of the light entrance segment 2 and a length of the light output segment 4. As in all other embodiments, the length of the light output segment 4 could be negligible. For example, the length of the light output segment 4 is less than 5% of the overall length L of the light guide body 1.

Figure 2:
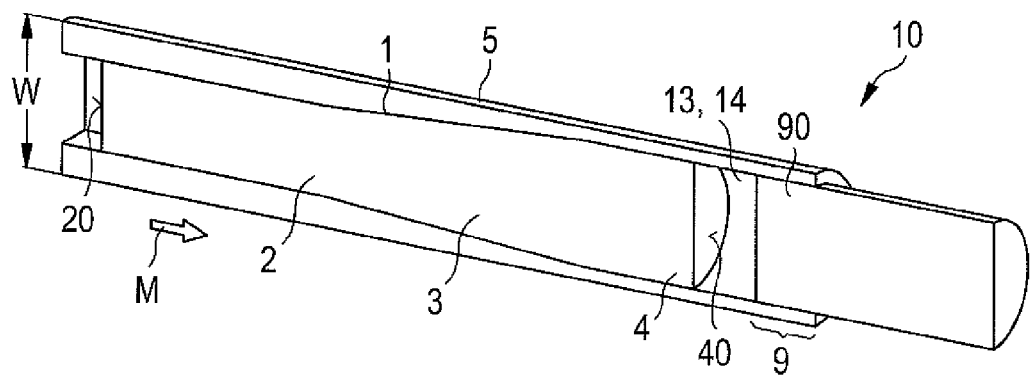

A further exemplary embodiment of the light guide 10 is shown in FIG. 2. The light guide 10 according to FIG. 2 further comprises a cladding 5 that is in direct contact with the light guide body 1. The cladding 5 surrounds the light guide body 1, in a direction perpendicular to the direction M of main light guidance, completely. For example, the cladding 5 has a cross-section with a circular shape. Preferably, a diameter W of the cladding 5 is constant along the whole light guide 10. The cladding 5 protrudes over the light entrance face 20 and over the light output face 40 seen in a direction parallel to the direction M of main light guidance. The light guide body 1 and the cladding 5 can be produced by two-component injection molding, for example. In particular, the light guide body 1 is made of a transparent plastic and the cladding 5 is made of a white reflective plastic.

Optionally, the cladding 5 can comprise a connector 9 on a side of the cladding 5 near the light output face 40. By means of the connector 9, a light pipe 90 can be fixed with the light guide body 1 reversibly or irreversibly. Between the light guide body 1 and the light pipe 90, there can be an air gap 13 or a cavity 13 or a filling material 14. Other than illustrated, it is also possible that the light pipe 90 is in direct contact with the light output face 40. Preferably, a length of the light pipe 90 exceeds the length L of the light guide body 1, for example by at least a factor of 5 or by at least a factor of 20.

Figure 3:
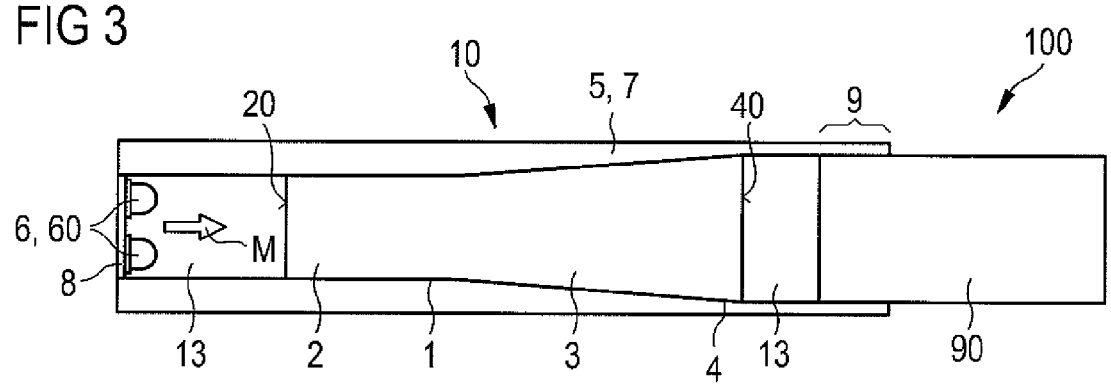

In FIG. 3, a cross-sectional view of an exemplary embodiment of a semiconductor luminaire 100 is shown. The luminaire 100 comprises, for example, a light guide 10 as depicted in FIG. 1 or 2. Additionally, the semiconductor luminaire 100 comprises a light source 6 arranged on a carrier 8. The light source 6 comprises at least two optoelectronic semiconductor chips 60, for example light emitting diodes, which are arranged on the carrier 8. Between the light source 6 and the light entrance face 20 of the light guide body 1, there can be the air gap 13 or the cavity 13.

The carrier 8 with the light source 6 can be fixed with the light guide body 1 by a housing 7 in the case of a light guide 10 according to FIG. 1 or by the cladding 5 itself in the case of a light guide 10 according to FIG. 2. The carrier 8 can be a printed circuit board by way of example.

Figure 4:
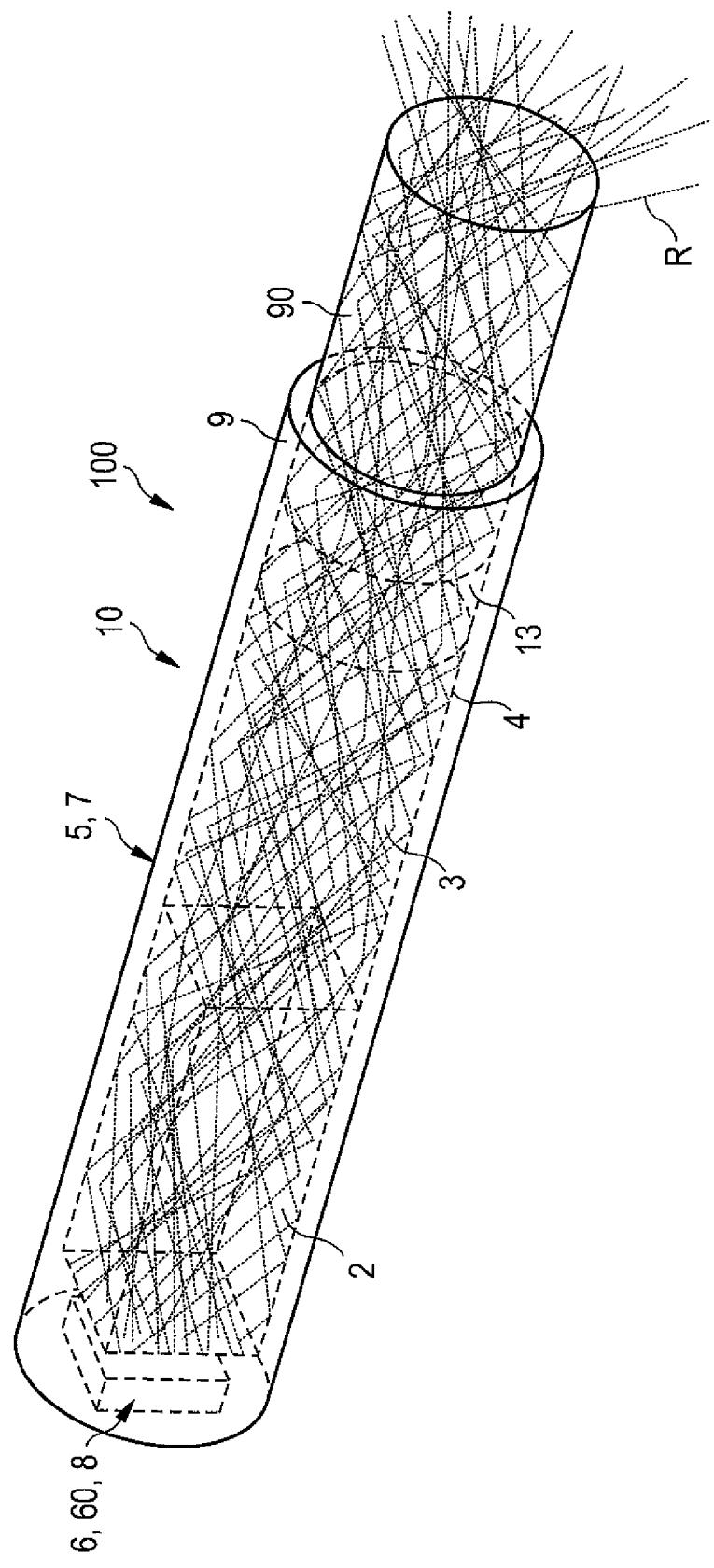

A further exemplary embodiment of the semiconductor luminaire 100 is shown in FIG. 4 in a perspective illustration. In this embodiment, the light guide body 1 is form-fit with the light source 6 and the carrier 8 on a side of the carrier 8 facing the light guide body 1. For example, the light guide body 1 is molded over the carrier 8 and the light source 6. The cladding 5 or the housing 7 can be molded over the carrier 8 and the light guide body 1, for example, in a second shot of a two-component molding process.

In FIG. 4, different light rays emitted by the light source 6 are schematically shown. In particular, the different optoelectronic semiconductor chips 60 of the light source 6 emit radiation in different spectral regions in the visible spectral range. Near the light source 6, the different colors are not yet mixed. Such a color mixing is realized in the polygonal shaped light entrance segment 2 of the light guide body 1. After passing the light entrance segment 2 or the whole light guide body 1, the radiation emitted by the light source is mixed concerning the different colors.

Figure 5:
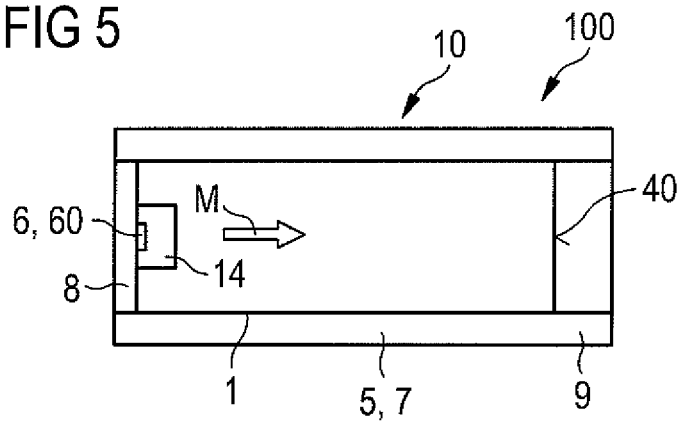
FIGS. 5 to 7 show exemplary embodiments of semiconductor luminaires comprising a light guide.

A further exemplary embodiment of the semiconductor luminaire 100 is shown in FIG. 5. The semiconductor chips 60 of the light source 6 are surrounded by a filling material 14 which can contain a phosphorous for converting part of the radiation emitted by the semiconductor chips 60 in a radiation with another frequency. The light guide body 1 is in direct contact with the filling material 14 so that there is no air gap an no jump in the refractive index between the semiconductor chips 60 and the light output face 40.

In the cross-sectional side view according to FIG. 5, the light guide body 1 has a constant diameter along the direction M of main light guidance. For example, the shown cross-sectional view is through a diagonal of the polygonal light entrance segment 2 of the light guide 10.

In contrast to what is shown in FIG. 5, the cladding 5 and/or the housing 7 can be flush with the light output face 40. This can be the case also in all other exemplary embodiments. Optionally, the housing 7 or the cladding 5 can be flush with a main area of the carrier 8, the light source 6 is applied on, other than illustrated. It is also possible that a cross-section of the carrier is equal or nearly equal to a cross-section of the housing 7 and/or the cladding 5.

Figure 6:
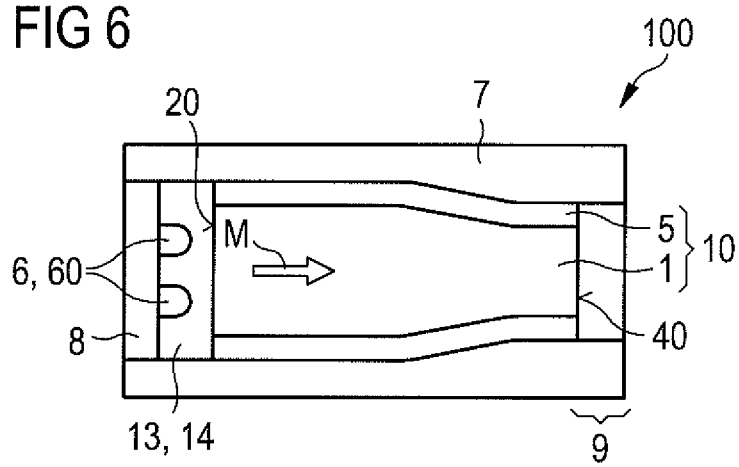

According to FIG. 6, the semiconductor luminaire 100 comprises the cladding 5 of the light guide 10 as well as the housing 7. The cladding 5 has a constant thickness or nearly a constant thickness along the direction M of main light guidance. A thickness of the housing 7 varies along the direction M of main light guidance so that an outer diameter of the housing 7 is constant along the direction M of main light guidance.

The diameter of the light guide body 1 at the light entrance face 20 can exceed the diameter of the light guide body 1 at the light output face 40. It is further possible that there is the air gap 13 or cavity 13 or the filling material 14 between the light guide 10 and the light source 6.

Figure 7:
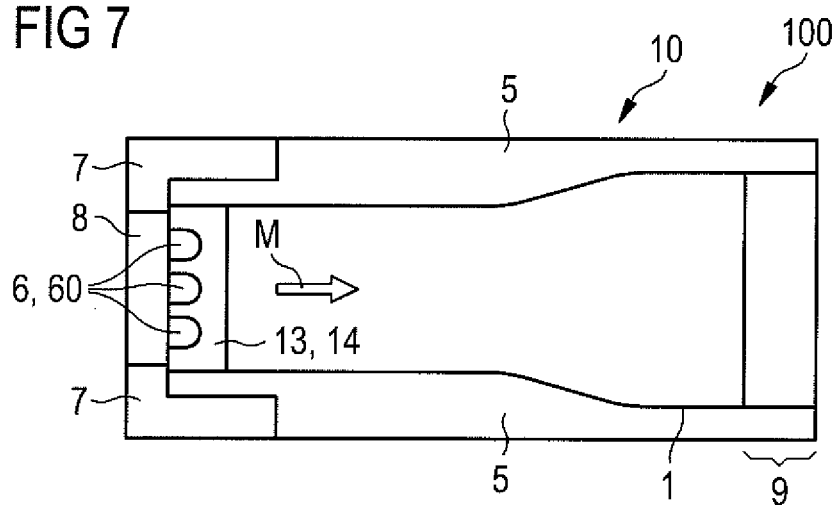

According to the exemplary embodiment of FIG. 7, the cladding 5 of the light guide 10 has a steplike cross-section near the housing 7 so that by means of the cladding 5, the light guide 10 can be plugged into and adjusted with the housing 7. An outer diameter of the housing 7 can be the same as an outer diameter of the cladding 5. The cladding 5 can be in direct contact with a bottom area of the housing 7. The connection between the cladding 5 and the housing 7 can be a reversible or an irreversible one.

The invention is not restricted to the exemplary embodiments by the description on the basis of said exemplary embodiments. Rather, the invention encompasses any new feature and also any combination of features, which in particular comprises any combination of features in the patent claims and any combination of features in the exemplary embodiments, even if this feature or this combination itself is not explicitly specified in the patent claims or exemplary embodiments.

I claim:

1. A light guide, comprising a single-pieced light guide body, the light guide body includes:
   a transparent material;
   a light entrance segment having a first cross section with a polygonal shape;
   a light output segment having a second cross section with a circular or elliptic shape; and
   a transition segment arranged adjacent to and between the light entrance segment and the light output segment,
   wherein the first cross section changes to the second cross section along the transition segment, and
   further comprising a cladding,
   wherein the cladding is in direct contact with the light guide body,
   wherein the cladding comprises a translucent material with a coefficient of reflection of 0.75 or more,
   wherein the cladding completely covers the light guide body in a direction perpendicular to a direction of main light guidance, and
   wherein the cladding has a constant or nearly constant diameter along the direction of main light guidance.

2. The light guide according to claim 1, wherein the first cross section comprises an area A1 and the second cross section comprises an area A2, and wherein $1 \leq A2/A1 \leq 2$.

3. The light guide according to claim 1, wherein the transition segment comprises a length T and the second cross section comprises an average diameter D2, and wherein $0.75 \leq T/D2 \leq 1.75$.

4. The light guide according to claim 3, wherein $3 \text{ mm} \leq D2 \leq 25 \text{ mm}$.

5. The light guide according to claim 3, wherein the light guide body comprises an overall length L and the light entrance segment comprises a length E, and wherein $0.5 \leq E/L \leq 0.75$.

6. The light guide according to claim, wherein $0.1 \leq T/L \leq 0.8$.

7. The light guide according to claim 1, wherein a shape of the first cross section is rectangular or square.

8. The light guide according to claim 1, wherein the light guide body is a rigid body and has a longitudinal axis which is a straight line.

9. The light guide according to claim 1, wherein a cross section area of the light guide body monotonically increases along the direction of main light guidance.

10. A semiconductor luminaire comprising:
    at least one light guide according to claim 1;
    a carrier;
    a light source arranged on the carrier, the light source including at least one Optoelectronic semiconductor chip for emittinng radiation; and
    a housing providing a firm mechanical connection between the carrier and the light guide;
    wherein in operation the light source emits multi-colored visible radiation, and
    wherein the light guide is capable of mixing the different colors of the multi-colored visible radiation.

11. The semiconductor luminaire according to claim 10, wherein the light guide body of the light guide, at a light entrance face, is form-fit with the light source and the carrier at least in part.

12. The semiconductor luminaire according to claim 10, wherein the housing further comprises a connector for mechanically and optically connecting a light pipe with the semiconductor lamp, the connector being located on a light output face of the light guide body remote from the carrier.

* * * * *

UNITED STATES PATENT AND TRADEMARK OFFICE
CERTIFICATE OF CORRECTION

| | | |
|---|---|---|
| PATENT NO. | : 8,540,409 B2 | Page 1 of 1 |
| APPLICATION NO. | : 12/789398 | |
| DATED | : September 24, 2013 | |
| INVENTOR(S) | : Christopher Eichelberger | |

It is certified that error appears in the above-identified patent and that said Letters Patent is hereby corrected as shown below:

In the Claims

Column 8, line 32 (claim 6, line 1) after "claim" and before the "," insert --5--.

Column 8, line 46 (claim 10, line 5) change "Optoelectronic" to --optoelectronic--.

Signed and Sealed this
Eighteenth Day of March, 2014

Michelle K. Lee
*Deputy Director of the United States Patent and Trademark Office*